(12) United States Patent
Yu et al.

(10) Patent No.: US 11,126,847 B2
(45) Date of Patent: Sep. 21, 2021

(54) SYSTEM AND METHOD FOR INTEGRATING MACHINE LEARNING AND CROWD-SOURCED DATA ANNOTATION

(71) Applicant: Robert Bosch GmbH, Stuttgart (DE)

(72) Inventors: Lixiu Yu, Pittsburgh, PA (US); Wan-yi Lin, Pittsburgh, PA (US); Ji Eun Kim, Pittsburgh, PA (US)

(73) Assignee: ROBERT BOSCH GMBH, Stuttgart (DE)

( * ) Notice: Subject to any disclaimer, the term of this patent is extended or adjusted under 35 U.S.C. 154(b) by 48 days.

(21) Appl. No.: 16/428,468

(22) Filed: May 31, 2019

(65) Prior Publication Data

US 2020/0380258 A1    Dec. 3, 2020

(51) Int. Cl.
*G06K 9/00* (2006.01)
*G06N 20/00* (2019.01)
*G06K 9/62* (2006.01)

(52) U.S. Cl.
CPC ..... *G06K 9/00671* (2013.01); *G06K 9/00718* (2013.01); *G06K 9/623* (2013.01); *G06N 20/00* (2019.01)

(58) Field of Classification Search
CPC ........... G06K 9/00671; G06K 9/00718; G06K 9/623; G06N 20/00
See application file for complete search history.

(56) References Cited

U.S. PATENT DOCUMENTS

| | | | | |
|---|---|---|---|---|
| 10,949,608 | B2* | 3/2021 | Terra | G06K 9/00469 |
| 2017/0099200 | A1* | 4/2017 | Ellenbogen | H04L 43/08 |
| 2019/0279106 | A1* | 9/2019 | Yadav | G06F 3/167 |
| 2019/0385610 | A1* | 12/2019 | Steelberg | G10L 15/26 |
| 2020/0019898 | A1* | 1/2020 | Harrison | G06N 20/10 |

OTHER PUBLICATIONS

Website https://www.darpa.mil/program/explainable-artificial-intelligence, Gunning, David, Explainable Artificial Intelligence (XAI), (Prior Art), Retrieved from Internet on May 31, 2019, 4 pgs.
Website https://ai.google/research/teams/brain/pair, People-AI Research (PAIR), (Prior Art) Retrieved from Internet on May 31, 2019, 6 pgs.
https://www.mighty.ai/, "Generate ground truth datasets on a platform built for computer vision data", Copyright 2014-2019, Retrieved from Internet on May 31, 2019, 4 pgs.

(Continued)

*Primary Examiner* — Ping Y Hsieh
(74) *Attorney, Agent, or Firm* — Brooks Kushman P.C.

(57) ABSTRACT

A data annotation system for a machine-learning system includes a computing system configured to execute a machine-learning algorithm for generating data annotations of input data. The computing system is further configured to execute an interface for communicating results and predictions of the machine-learning algorithm to non-expert workers for review. The interface communicates with the non-expert worker using visualization and natural language to elicit feedback to improve performance of the machine-learning algorithm.

20 Claims, 9 Drawing Sheets

(56) References Cited

OTHER PUBLICATIONS

Website https://www.figure-eight.com/crowdsourcing-and-machine-learning, "Crowdsourcing and Machine Learning", Aug. 2, 2013, Retrieved from Internet on May 31, 2019.
Website https://www.scale.ai/, "The API for Training Data", Copyright 2019 Scale Labs, Inc., Retrieved from Internet on May 31, 2019, 13 pgs.
Website https://www.fold.it/portal/, "Solve Puzzles for Science", Retrieved from Internet on May 31, 2019, 3 pgs.
Website https://ieexplore.ieee.org/document/1642623, "Games with a purpose", IEEE Explore Journals & Magazines, Computer, vol. 39, Issue 6, Jun. 19, 2006, 1 pg.
Wang et al., "A Semi-Automatic Semi-Automatic Video Labeling Tool for Autonomous Driving Based on Multi-Object Detector and Tracker", 2018 Sixth International Symposium on Computing and Networking (CANDAR), IEEE, Nov. 23, 2018 (Nov. 23, 2018), pp. 201-206, XP033485460, 6 pages.
Website: Carl Vondrick: "vatic—Video Annotation Tool", Jul. 15, 2010 (Jul. 15, 2010), XP054981012, Retrieved from the Internet: URL:https://www.youtube.com/watch?v=uz1 DXC5HkR0, Retrieved on Oct. 16, 2020, 1 page.
Vondrick et al., "Efficiently Scaling Up Video Annotation with Crowdsourced Marketplaces", Sep. 5, 2010 (Sep. 5, 2010), 12th European Conference on Computer Vision, ECCV 2012; [Lecture Notes in Computer Science], Springer Berlin Heidelberg, Berlin Germany, pp. 610-623, XP019150768, 14 pages.
Kletz et al., "A comparative study of video annotation tools for scene understanding : yet (not) another annotation tool", Proceedings of the 10th ACM Multimedia Systems Conference, Jun. 18, 2019 (Jun. 18, 2019), pp. 133-144, XP557 41 091 , New York, NY, USA, 12 pages.
Kovashka et al., "Crowdsourcing in Computer Vision", arxiv.org, Cornell University Library, 201 OLIN Library Cornell University Ithaca, NY 14853, Nov. 7, 2016 (Nov. 7, 2016), XP080729974, 69 pages.
Comaschi et al., "A tool for fast ground truth generation for object detection and tracking from video", 2014 IEEE International Conference on Image Processing (ICIP), IEEE, Oct. 27, 2014 (Oct. 27, 2014), pp. 368-372, XP032966618, 5 pages.
Gaur et al., "Video annotation tools: A Review", 2018 International Conference on Advances in Computing, Communication Control and Networking (ICACCCN), IEEE, Oct. 12, 2018 (Oct. 12, 2018), pp. 911-914, XP033571098, 4 pages.

* cited by examiner

SYSTEM AND METHOD FOR INTEGRATING MACHINE LEARNING AND CROWD-SOURCED DATA ANNOTATION

TECHNICAL FIELD

This application generally relates to a system for cooperative data annotation by crowd-sourced tasks and machine-learning algorithms.

BACKGROUND

Many systems are beginning to incorporate Artificial Intelligence (AI) and machine-learning concepts for decision making. Machine-learning systems require a large amount of input data in order to learn the proper response to various inputs. For example, the input data may include a variety of input combinations and the corresponding outcome that should be learned. A large amount of raw source data may be available. However, the raw source data must be processed to provide the proper inputs to the machine-learning algorithm. Relevant features and prediction outcomes must be associated with the input data in order to properly train the machine-learning algorithm. As such, efficient methods for annotating the input data are desired.

SUMMARY

A data annotation system includes a computing system programmed to execute a machine-learning algorithm that is programmed to identify a feature as being a predetermined feature and a corresponding confidence level from an input dataset. The computing system is further programmed to, responsive to identifying the feature with a confidence level exceeding a threshold followed by a reduction in the confidence level to less than a low-confidence threshold, execute a crowd worker interface that is programmed to generate an interactive task configured to display the input dataset and the feature identified by the machine-learning algorithm and receive feedback from a crowd worker to identify a reason for the reduction.

The crowd worker interface may be further programmed to cause a text dialog to be displayed on a display screen, wherein the text dialog includes instructions to guide the crowd worker in completing the interactive task. The crowd worker interface may be further programmed to receive the feedback from the crowd worker as data corresponding to elements drawn on a display screen. The crowd worker interface may be further programmed to receive the feedback from the crowd worker as a text annotation of an on-screen object entered on a display screen. The crowd worker interface may be further programmed to cause, responsive to the input dataset corresponding to the reduction being displayed on a display screen, a dialog element to be displayed on the display screen that alerts the crowd worker to the reduction. The crowd worker interface may be further programmed to cause a dialog element to be displayed on a display screen that instructs the crowd worker to identify features for which a similar reduction in confidence level is expected to occur. The crowd worker interface may be further programmed to convert between machine-learning algorithm representations to visual representations suitable for human understanding. The input dataset may be a video segment comprised of a plurality of image frames. The computing system may be further programmed to execute the crowd worker interface responsive to the input dataset being randomly selected for monitoring.

A method includes identifying, by a machine-learning algorithm, a feature as being a predetermined feature and a corresponding confidence level from an input dataset. The method further includes generating, responsive to identifying the feature with a confidence level exceeding a threshold followed by a reduction in the confidence level to less than a low-confidence threshold, an interactive task for crowd sourcing to display the input dataset and the feature identified by the machine-learning algorithm on a display screen and receive feedback from a crowd worker to identify a reason for the reduction.

The method may further include causing a text dialog that includes instructions to guide the crowd worker in completing the interactive task to be displayed on the display screen. The method may further include causing, responsive to the input dataset corresponding to the reduction being displayed on the display screen, a dialog element to be displayed on the display screen that alerts the crowd worker to the reduction. The method may further include causing a dialog element to be displayed on the display screen that instructs the crowd worker to identify features for which a similar reduction in confidence level is expected to occur. The method may further include updating a dataset for the machine-learning algorithm with the feedback received from the crowd worker. The method may further include generating, responsive to input dataset being randomly selected for monitoring, the interactive task for crowd sourcing to display the input dataset and features identified by the machine-learning algorithm on a display screen and receive feedback from a crowd worker to identify inaccurate feature identification. The method may further include causing a dialog to be displayed that includes operational details of the machine-learning algorithm to aid the crowd worker in understanding the machine-learning algorithm.

A data annotation system includes a computing system programmed to execute a machine-learning algorithm that is programmed to identify a feature as a predetermined feature from an input dataset. The computing system is further programmed to responsive to a presence of conditions indicative of the feature being inaccurately identified, execute a crowd worker interface that is programmed to (i) generate an interactive task for completion by a crowd worker, and (ii), upon the interactive task being initiated by the crowd worker, display the feature identified by the machine-learning algorithm as the predetermined feature overlaid on the input dataset and receive feedback from the crowd worker to identify a reason for the feature being inaccurately identified.

The crowd worker interface may be further programmed to visually communicate predictions of the machine-learning algorithm and to identify areas of concern in natural language. The machine-learning algorithm may be further programmed to generate a confidence level corresponding to features identified as the predetermined feature, and the conditions indicative of the predetermined feature being inaccurately identified may include the confidence level being less than a low-confidence threshold. The machine-learning algorithm may be further programmed to generate a confidence level corresponding to features identified as the predetermined feature, and the conditions indicative of the predetermined feature being inaccurately identified may include the confidence level being greater than a predetermined threshold followed by a reduction in the confidence level to being less than a low-confidence threshold.

DETAILED DESCRIPTION

Figure 1:
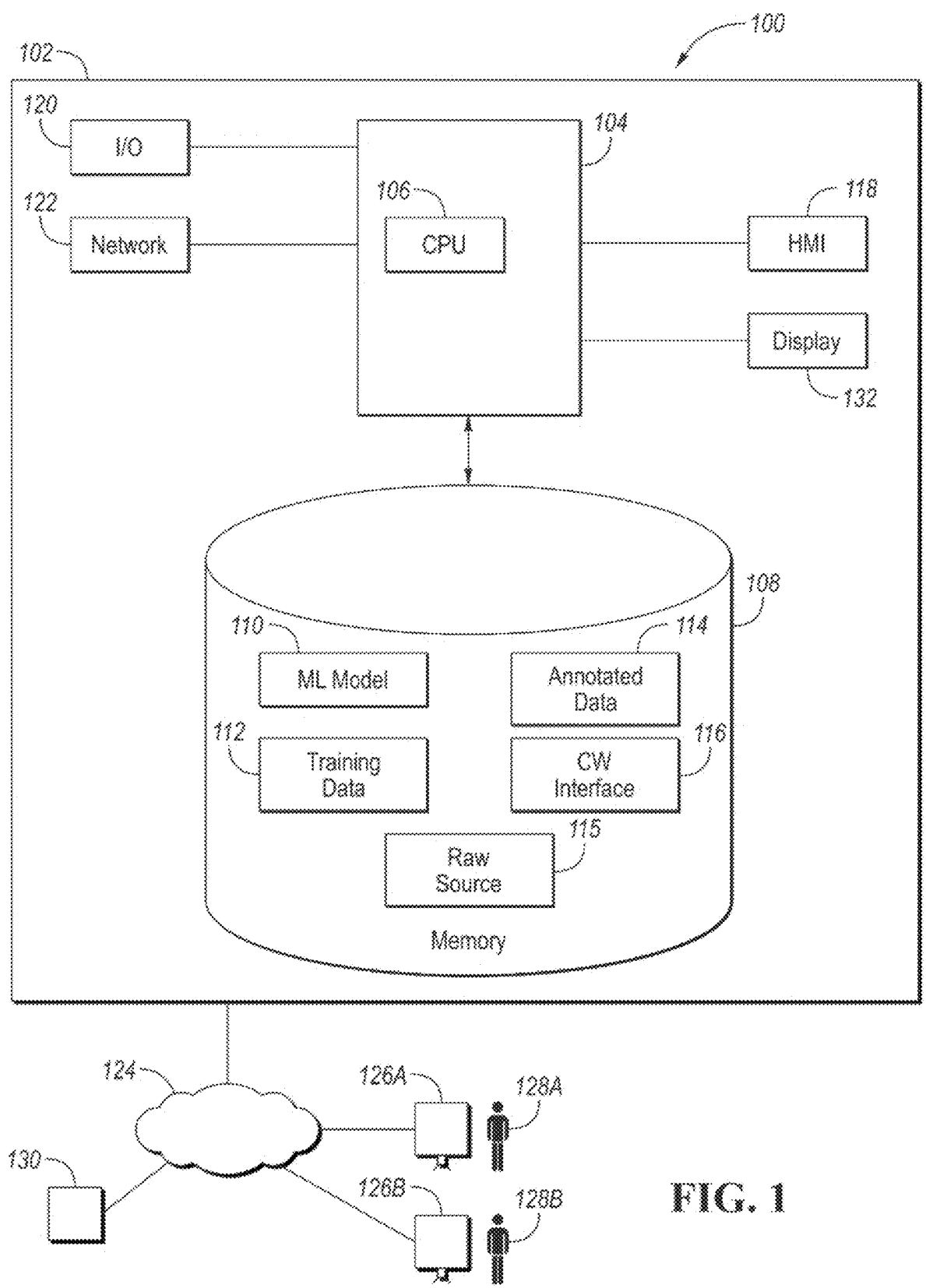
FIG. 1 depicts a possible configuration for data annotation system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, Many products are incorporating Artificial Intelligence (AI) and machine-learning concepts for decision making. To be effective, AI systems may be trained with large amounts of training data. The training data may include a variety of sensor input combinations along with an expected output for the parameter that is being generated by the AI system. For example, an AI system that identifies objects may use video or image inputs. The training data may include a set of images and corresponding positions of objects located in the images. Data annotation involves labeling or otherwise identifying the relevant data.

Machine-learning algorithms and crowdsourcing may be used for annotating large amounts of data. Each method has its own limitations. Machine-learning algorithms and crowdsourcing may be applied together for data annotation. Some workflow strategies may use a hand-off model between machines and crowds. That is, machine-learning algorithms and crowd workers each perform their own part of the tasks without direct interaction and each uses the other's input. Disclosed herein are systems and methods for implementing an active partnership between crowd workers and machine-learning algorithms for data annotation. Instead of treating machine-learning algorithms as black boxes, details and relevant information of the machine-learning algorithms are provided to explain the machine-learning processes to the crowd workers. The machine-learning algorithms may explicitly request help from crowd workers in real time and adjust instantly based on the feedback. Crowd workers may observe the performance of the machine-learning algorithms and provide assistance when needed. In one example, the active partnership is applied to annotate video images, such as creating bounding boxes for pedestrians in a series of road scenes. The system defines an effective model of crowd and AI collaboration for data annotation and extends the audience of explainable machine learning from experts to laymen.

Machine-learning algorithms have improved significantly in recent years and, for certain tasks, can outperform humans. The most highly performing algorithms are supervised. A supervised algorithm may require a large quantity of well-labeled or annotated data (e.g., tens of thousands of labeled images). For cost and performance considerations, it is desired that the large amounts of data be labeled correctly, efficiently, and quickly. However, labeling each single image precisely for a large dataset requires significant human effort. One way to reduce the amount of human effort is to pre-label the data by machine-learning algorithms. However, in many cases, a vision algorithm's labeling accuracy is low and correcting pre-labeling errors (such as imprecise boundaries of an object) requires more effort than labeling it directly. The main reason for such low accuracy is that vision models are usually trained on other datasets and applied to new datasets that need annotation, and it is well known that transferability of vision models are low.

Crowdsourcing systems may be used to accomplish high-cognitive tasks (e.g., sense-making of photos or written texts) by decomposing the high-cognitive tasks into relatively low-cognitive tasks that can be easily completed by average human workers without professional skills (e.g., without extensive domain knowledge). The crowd workers may be registered in crowdsourcing markets such as Amazon Mechanical Turk. Crowdsourcing has been used to perform tasks that are challenging for machine-learning algorithms due to the relatively low cost and high data-processing speed. However, performance of crowd workers may not be reliable and using crowd workers can be expensive. Such factors may constitute a barrier to annotating data in the field of autonomous driving, which requires a large amount of accurately annotated data collected from cameras and other sensors. From a crowd worker perspective, data annotation, such as drawing bounding boxes for pedestrians, can be tedious. As a result, crowd workers either choose not to take such tasks or produce low-quality results.

The disclosed approach aims to create an active partnership between machine-learning models and crowd workers that can overcome the limitations of both parties. Machine-learning models may be configured to explain themselves and actively elicit dynamic input from crowd workers regarding performance and the data characteristics of the test datasets while the machine-learning algorithms are running. For example, it may be helpful if the machine-learning algorithm can direct the crowd worker to the specific problem that the machine-learning algorithm is experiencing. This approach is predicted to increase machine-learning accuracy and motivate crowd workers to provide high quality annotation.

FIG. 1 depicts a data annotation system 100 to implement a system for annotating data using a cooperative crowd/machine concept. For example, the data annotation system 100 may be directed toward an autonomous driving system. The data annotation system 100 may include at least one computing system 102. The computing system 102 may include at least one processor 104 that is operatively connected to a memory unit 108. The processor 104 may include one or more integrated circuits that implement the functionality of a central processing unit (CPU) 106. The CPU 106 may be a commercially available processing unit that implements an instruction stet such as one of the x86, ARM, Power, or MIPS instruction set families. During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, a training dataset 112 for the machine-learning model 110, an annotated dataset 114 for storing results of the data annotation, raw source dataset 115, and a crowd worker interface 116 process.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the data annotation system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122.

The data annotation system 100 may be implemented using one or multiple computing systems. While the example depicts a single computing system 102 that implements all of the described features, it is intended that various features and functions may be separated and implemented by multiple computing units in communication with one another. The particular system architecture selected may depend on a variety of factors. As an example, the crowd worker interface 116 process could be implemented on a separate computing system.

Crowd workers 128 may utilize workstations 126 to access the external network 124. The crowd workers 128 may also be referred to as task executors. Crowd workers 128 may not be expected to have any domain expertise. The crowd workers 128 may be registered in one or more crowdsourcing markets such as Amazon Mechanical Turk. The crowdsourcing market may be implemented on one of the servers 130. The crowdsourcing market may allow a task requestor to upload tasks for completion by the crowd workers 128. The crowd workers 128 may access the crowdsourcing market using the workstations 126. The workstations 126 may include components similar to the computing system 102. The workstations 126 may be personal computing devices including a user interface for input and output. The workstations 126 may include a display device. For example, the workstations 126 may be computers having a display and keyboard. The workstations 126 may include tablets and cell phones.

The data annotation system 100 may implement a machine-learning algorithm 110 that is configured to analyze the raw source dataset 115 to generate the annotated dataset 114. The raw source dataset 115 may include raw or unprocessed sensor data that may be representative of an input dataset for a machine-learning system. The raw source dataset 115 may include video, video segments, images, text-based information, and raw or partially processed sensor data (e.g., radar map of objects). In some examples, the machine-learning algorithm 110 may be a neural network algorithm that is designed to perform a predetermined function. For example, the neural network algorithm may be configured in automotive applications to identify pedestrians in video images. The machine-learning algorithm 110 may be configured to generate the annotated dataset 114 for use by other machine-learning systems. For example, the annotated dataset 114 may be used as a training data for a pedestrian detection system for an automotive application.

The annotated dataset 114 may include annotations in addition to the raw source dataset 115. For example, when the raw source dataset 115 is video images, each frame incorporated into the annotated dataset 114 may have corresponding annotations. The annotations may include descriptions that are associated with identified coordinates of the image frame. For example, the annotations may include bounding boxes for particular features. The annotations may include color coding of particular features. The annotations may define text labels or descriptions for features found in the image.

The data annotation system 100 may store the training dataset 112 for the machine-learning algorithm 110. The training dataset 112 may represent a set of previously annotated data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In an example, the machine-learning algorithm 110 may be designed to identify the presence and location of pedestrians in video images and annotate the data accordingly. In this example, the training dataset 112 may include source videos with and without pedestrians and corresponding presence and location information. The source videos may include various scenarios in which pedestrians are identified.

The machine-learning algorithm 110 may be operated in a learning mode using the training dataset 112 as input. The machine-learning algorithm 110 may be executed over a number of iterations using the data from the training dataset 112. With each iteration, the machine-learning algorithm 110 may update internal weighting factors based on the achieved results. For example, the machine-learning algorithm 110 can compare output results (e.g., annotations) with those included in the training dataset 112. Since the training dataset 112 includes the expected results, the machine-learning algorithm 110 can determine when performance is acceptable. After the machine-learning algorithm 110 achieves a predetermined performance level (e.g., 100% agreement with the outcomes associated with the training dataset 112), the machine-learning algorithm 110 may be executed using data that is not in the training dataset 112. The trained machine-learning algorithm 110 may be applied to new datasets to generate annotated data.

The machine-learning algorithm 110 may be configured to identify a particular feature in the raw source data 115. The raw source data 115 may include a plurality of instances or input dataset for which annotation results are desired. For example, the machine-learning algorithm 110 may be configured to identify the presence of a pedestrian in video images and annotate the occurrences. The machine-learning algorithm 110 may be programmed to process the raw source data 115 to identify the presence of the particular features. The machine-learning algorithm 110 may be configured to identify a feature in the raw source data 115 as a predetermined feature (e.g., pedestrian). The raw source data 115 may be derived from a variety of sources. For example, the raw source data 115 may be actual input data collected by a machine-learning system that is using the annotated dataset 114. The raw source data 115 may be machine generated for testing the data annotation system. As an example, the raw source data 115 may include raw video images from a camera.

In the example, the machine-learning algorithm 110 may process the raw source data 115 and output an indication of the presence of a pedestrian. The output may also include a relative position of the pedestrian within the video images. Such information may be part of the annotation. In addition, the output may include an accuracy prediction or confidence level of the output. The machine-learning algorithm 110 may generate a confidence level or factor for each output generated. For example, a confidence value that exceeds a predetermined high-confidence threshold may indicate that the machine-learning algorithm 110 is confident that the identified feature corresponds to the particular feature. A confidence value that is less than a low-confidence threshold may indicate that the machine-learning algorithm 110 has some uncertainty that the particular feature is present.

The computing system 102 may further include a crowd worker interface process 116 that is programmed to provide an interface between the machine-learning algorithm 110 and the crowd workers 128 (via the work stations 126). The crowd worker interface 116 may be predefined and/or programmed by the developer of the machine-learning algorithm 110. The developer may identify a predetermined set of errors that may cause the machine-learning algorithm 110 to improperly annotate the raw source data 115. Corresponding to the predetermined set of errors, the developer may generate scripted dialogs for each of the errors. The scripted dialogs may include a particular request to the crowd worker 128 to provide input in a particular manner. For example, for annotating video images, the crowd worker interface 116 may request that the crowd worker 128 circle or highlight an area of the displayed image. In other examples, the crowd worker interface 116 may request a text input. In other examples, the crowd worker interface 116 may request the crowd worker 128 to point and click on areas of interest on the displayed image. The crowd worker interface 116 may be configured to identify each type of error that causes inaccuracies in the machine-learning algorithm 110. The crowd worker interface 116 may monitor operation of the machine-learning algorithm 110 to detect conditions in which an inaccuracy may be present. For example, the crowd worker interface 116 may access internal variables of the machine-learning algorithm 110 to determine the accuracy and performance.

A crowd worker 128 may be able to process the raw source data 115 to determine if the particular feature is present. For a visual task, the crowd worker 128 may be able to reliably indicate the presence of the particular feature (e.g., pedestrian) in the raw source data 115. In addition, the crowd worker 128 may be well-suited to identify other features that may be causing the machine-learning algorithm 110 to have trouble with the identification. In addition, when the annotation results generated by the machine-learning algorithm 110 are displayed, the crowd-worker 128 may be able to determine if the result is reasonable.

The crowd worker interface 116 may generate a crowd-source task. When the confidence level is low, it may be useful to confirm or verify the output via an interactive crowd-source task. In other cases, some of the raw source data 115 may be randomly selected for monitoring by a crowd-source task. The crowd-source task may be uploaded to a server 130 that hosts a crowd-sourcing marketplace. The crowd-source task may be assigned to or selected by one of the crowd workers 128 that is registered in the marketplace. The crowd worker 128 may access the task via the external network 124 using the workstation 126. In some configurations, the interactive task may be an executable program that is downloaded and executed on the crowd worker workstation 126. The executable program may include a graphical interface and establish communication with the crowd worker interface 116 via the external network 124. The crowd worker interface 116 may then communicate with the task to exchange data. In other examples, the task may be a link to a webpage associated with the crowd worker interface 116. The task may be accessed by the crowd worker 128 using a web browser executed on the workstation 126. The task establishes a communication link between the crowd worker interface 116 and the crowd worker 128. The crowd worker interface 116 may provide content to be displayed on the crowd worker workstation 126. The crowd worker workstation 126 may be configured to provide crowd worker input data to the crowd worker interface 116.

During execution of the crowd-source task, the crowd worker interface 116 may execute the machine-learning algorithm 110 for a particular set of input data from the raw source dataset 115. The crowd worker interface 116 may manage starting and stopping the machine-learning algorithm 110 as the crowd-source task progresses. The crowd worker interface 116 may also update the input data to the machine-learning algorithm 110 based on inputs generated and returned by the crowd worker 128. For configurations in which the set of input data represents performance over an interval of time, the crowd worker interface 116 may control sequencing of the machine-learning algorithm 110. For example, the crowd worker interface 116 may allow for stepping through execution of the machine-learning algorithm 110 for each unit of time (e.g., sampling interval of the input dataset).

The crowd worker interface 116 may be configured to convert information from the machine-learning algorithm 110 to a natural language representation that non-experts can understand. The crowd worker interface 116 may generate dialog elements to remind crowd workers to pay attention to possible inaccuracies of the machine-learning algorithms 110 in a natural language. The crowd worker interface 116 may also be configured to communicate machine-learning algorithm 110 predictions in a visual manner that are easily interpreted by humans (e.g., visualization). For example, the crowd worker interface 116 may output a heat map of salient features used by the machine-learning algorithm 110. The crowd worker interface 116 may implement conversational agents to support the interaction between crowd workers 128 and the machine-learning algorithms 110. The crowd worker interface 116 may be programmed to receive feedback from the crowd worker 128 as data corresponding to elements drawn or typed on a display screen by the crowd worker 128.

Figure 2:
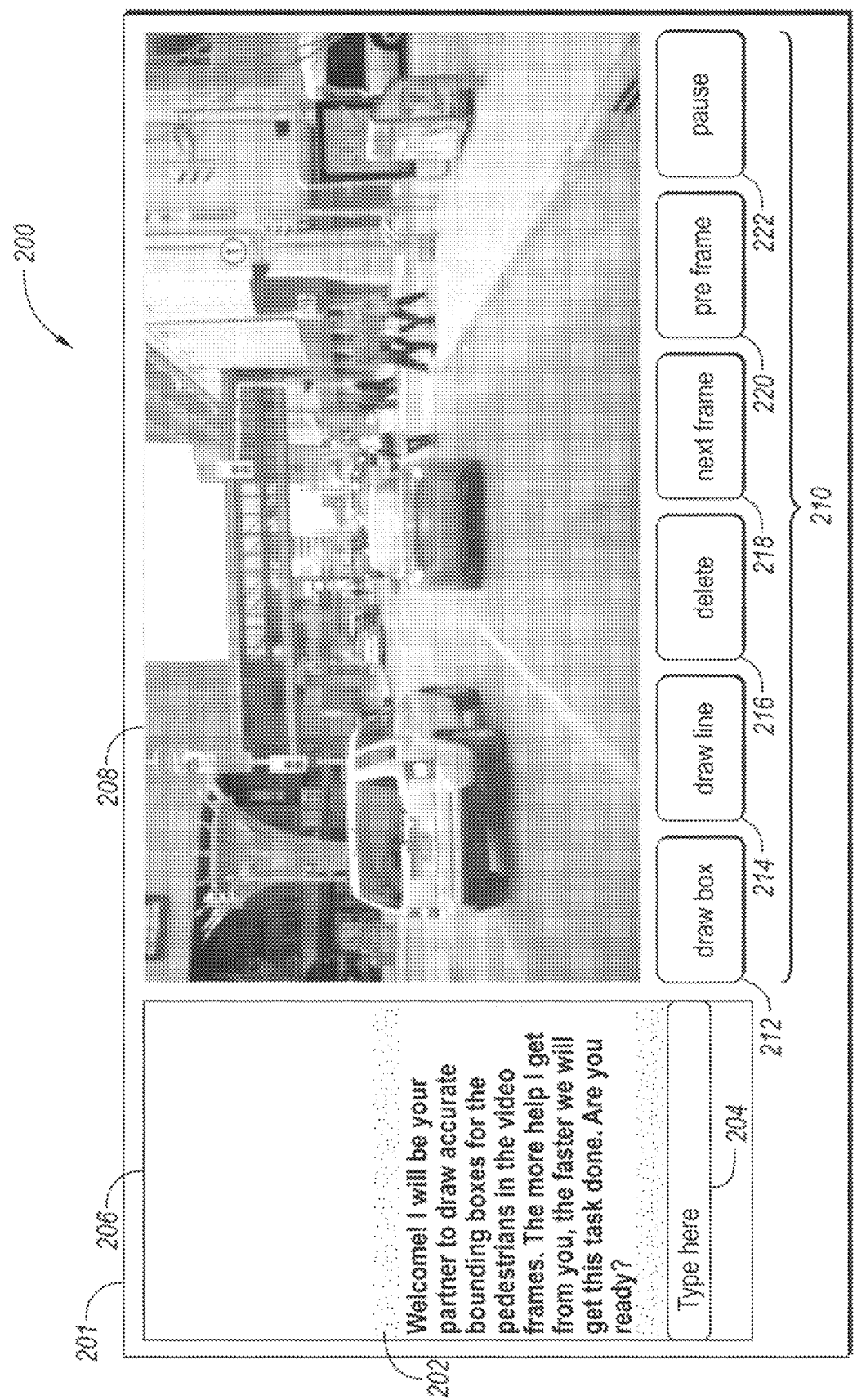
FIG. 2 depicts an example of a display interface for the data annotation system.

FIG. 2 depicts a possible example of a first snapshot 200 of a display screen 201 generated by the crowd worker interface 116. The crowd worker interface 116 may be defined to include a chat window 202 for exchanging text-based information with the crowd worker 128. The chat window 202 may include a text input field 204 in which the crowd worker 128 may enter text information. The chat window 202 may display dialog generated by the crowd worker interface 116. The dialog may include introductory information at the start of the task. For example, the dialog may briefly explain the work needed from the crowd worker 128. The dialog may further include information regarding relevant details of the machine-learning algorithm 110. The chat window 202 may also display text responses entered by the crowd worker 128. The contents of the chat window 202 may be saved in the memory unit 108 for later analysis. In this case, the dialog includes a greeting to welcome the crowd worker 128.

The crowd worker interface 116 may further define an image window 208 for displaying images and/or videos related to the defined task. The crowd worker interface 116 may further define one or more virtual buttons 210 for controlling screen-based operations. For example, the virtual buttons 210 may include a pause command 222 that is configured to pause the video at the present frame. The virtual buttons 210 may include a next frame command 218 and a previous frame command 220 to advance the video in the stated direction by a single frame. The virtual buttons 210 may include a play command configured to advance the frames automatically. In some configurations, the pause command 222 and the play command may share a dynamically-labeled virtual button.

The virtual buttons 210 may also include commands for allowing the crowd worker 128 to interact with the video images. For example, the virtual buttons 210 may include a draw box command 212 to initiate a box drawing session on the displayed image. The draw box command 212 may enable the crowd worker 128 to encompass any an area on the figure to highlight a particular feature (e.g., not limited to a box shape). As an example, the crowd worker 128 may draw a box by moving a curser to a screen location, depressing a button or key, and moving the curser around an area to be enclosed. The crowd worker interface 116 may extend a line as the curser is moved. In other examples, the draw box command 212 may be limited to forming a box shape.

The virtual buttons 210 may include a draw line command 214 configured to initiate a line drawing session on the displayed image. The crowd worker 128 may draw line by moving the curser to a screen location, pressing a button or key, moving the curser to a final location, and releasing the button or key. The crowd worker interface 116 may depict the line as the curser is moved.

The virtual buttons 210 may include a delete command 216 that is configured to cause an object on the screen to be deleted. For example, the crowd worker 128 may delete an item displayed on the screen by selecting the delete command 216, pointing to the item with the curser, and pressing a button or key. In other configurations, the crowd worker 128 may highlight an item on the screen and then select the delete command 216. While the commands depicted in the example are virtual buttons, the commands may also be implemented in pull-down or pop-up menus. In other configurations, the commands may be defined as keystrokes.

The crowd worker interface 116 may be predefined by the system architect/designer and may be configured to elicit information that is useful to the machine-learning algorithm 110. The crowd worker interface 116 may be implemented as a web-based interface written in Hypertext Markup Language (HTML). For example, the crowd worker 128 may access the crowd worker interface 116 using a web browser and navigating to a website associated with the computing system 102.

Figure 3:
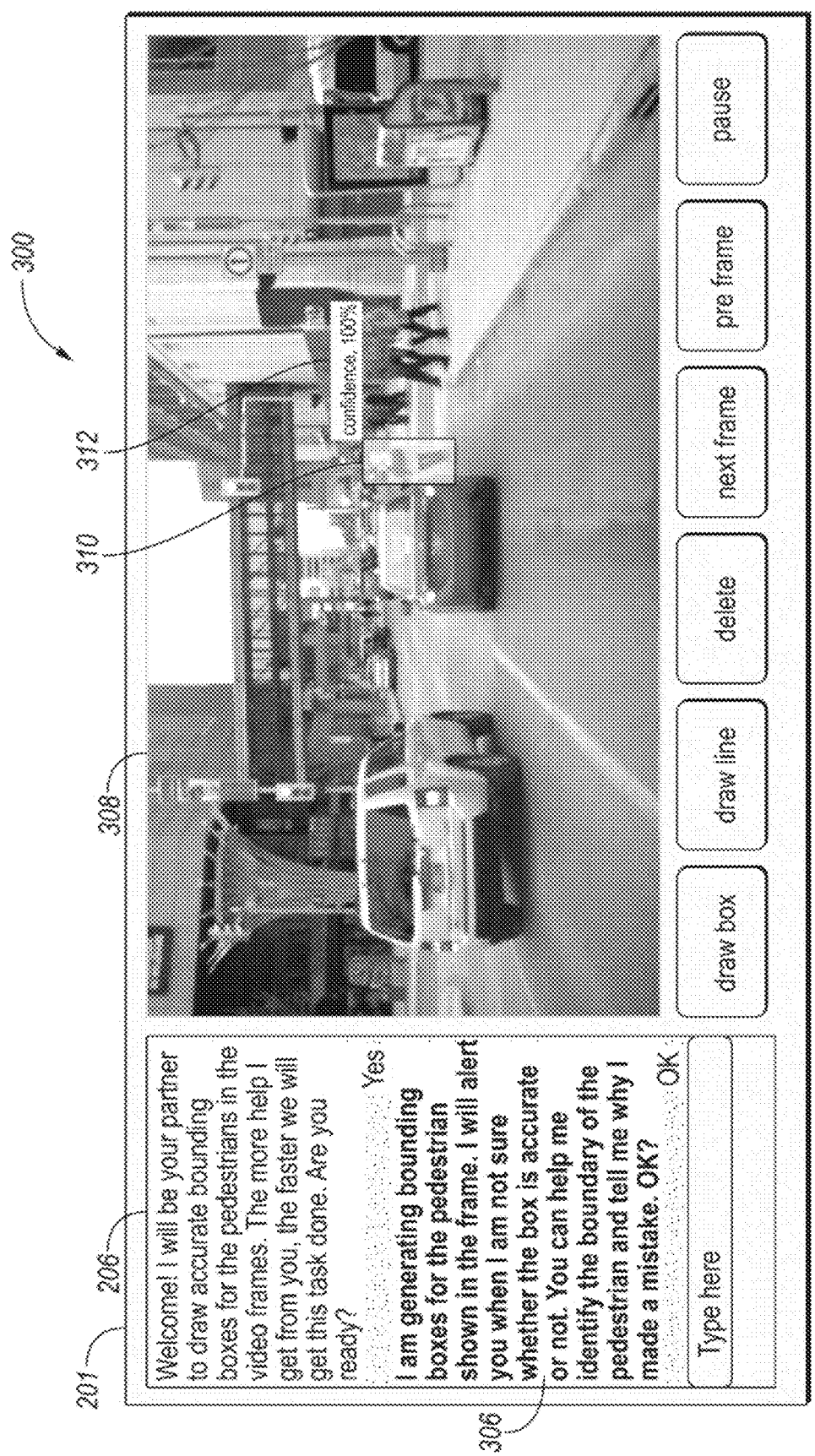
FIG. 3 depicts an example of a display output for the data annotation system that also includes machine-learning algorithm predictions.

FIG. 2 may represent the display screen upon initiation of the crowd-source task. FIGS. 3-8 represent additional display screen contents as the task is executed and are described herein. FIG. 3 depicts an example of a second snapshot 300 of the display screen 201 that may represent another portion of the task execution. A second image frame 308 may be displayed on the display screen 201. In addition, features or data (e.g., annotations) generated by the machine-learning algorithm 110 may be overlaid on the image. For example, a bounding box 310 may be drawn to reflect a specific type of object recognized by the machine-learning algorithm 110. In addition, descriptive text 312 may be displayed proximate the bounding box 310. In the example, the bounding box 310 represents a pedestrian identified by the machine-learning algorithm 110 and the descriptive text 312 is a confidence level associated with the bounding box 310. In this example, the descriptive text 312 indicates a confidence level of 100%.

The crowd worker interface 116 may also generate a descriptive dialog 306 in the chat window 206. In the example, the descriptive dialog 306 provides information as to the display content and provides an indication of the assistance that may be needed from the crowd worker 128.

Figure 4:
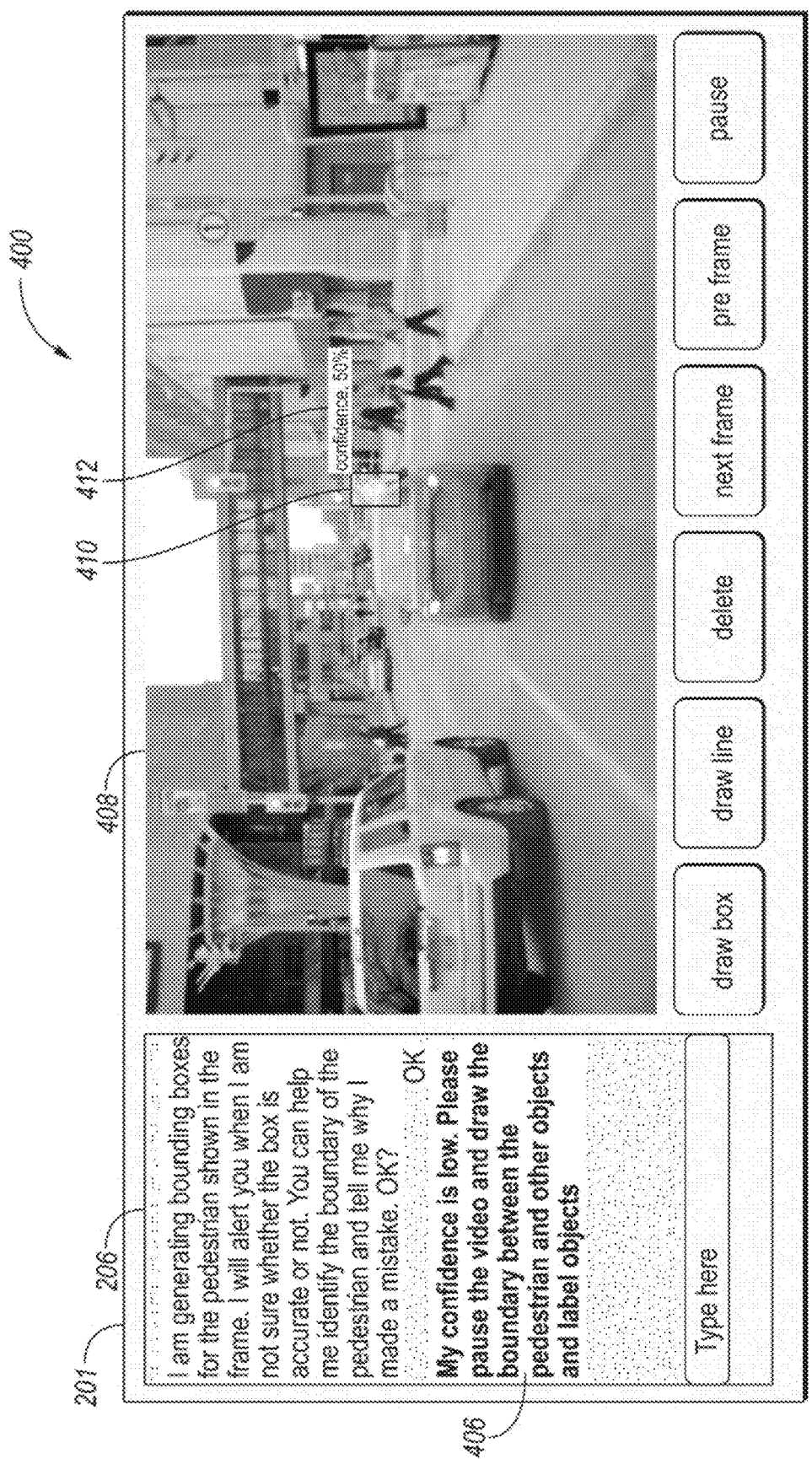
FIG. 4 depicts an example of a display output for the data annotation system that includes machine-learning algorithm predictions at a different time.

FIG. 4 depicts an example of a third screen snapshot 400 of the display screen 201 that may represent another portion of the task execution. A third image 408 may be displayed on the display screen 201. In the example, the image is a frame of the video that is being streamed or provided by the crowd worker interface 116. Features and/or data generated and tracked by the machine-learning algorithm 110 may be overlaid on the image. In the example, the bounding box 410 is displayed and descriptive text 412 is displayed proximate the bounding box 410. In this example, the descriptive text indicates a confidence level of 50%. The third screen snapshot 400 represents a situation in which the confidence level associated with a tracked object has been reduced from a previous snapshot. In this example, the crowd worker interface may display an instruction dialog 406 in the chat window 206. In this example, the instruction dialog 406 instructs the crowd worker 128 to pause the video and draw a boundary between the tracked object and any nearby objects. In this case, the car partially obstructs the view of the tracked pedestrian such that the bounding box 410 includes a portion of the car.

Figure 5:
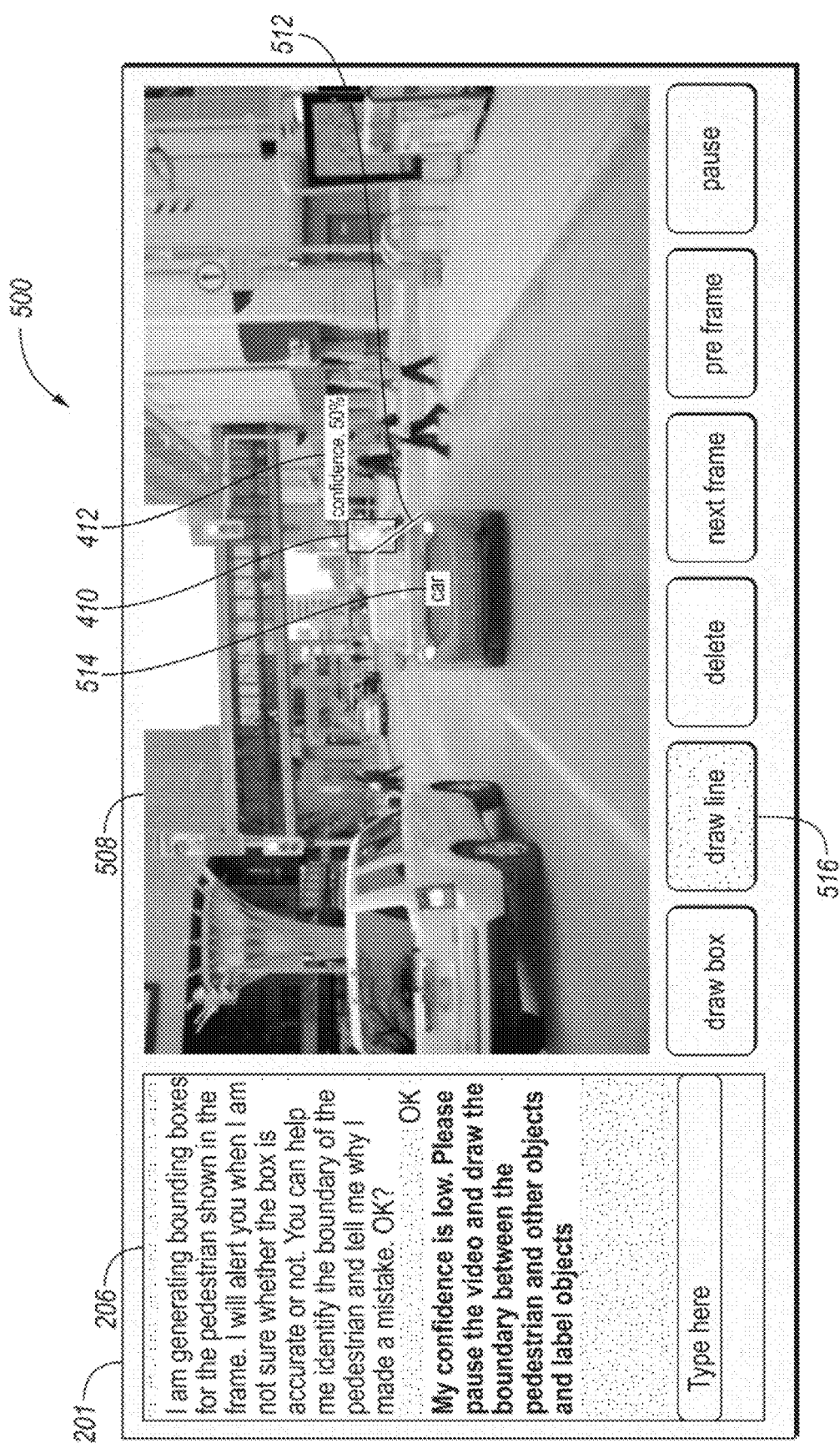
FIG. 5 depicts an example of a display output for the data annotation system that includes annotations inserted by a task executor.

FIG. 5 depicts an example of a fourth screen snapshot 500 of the display screen 201 that may represent another portion of the task execution. In this case, the contents displayed on the display screen 201 may be paused to allow the crowd worker 128 to analyze the content. A fourth image 508 may be displayed on the display screen 201. The fourth screen snapshot 500 may be similar to the third screen snapshot 400 with the addition of crowd worker inputs. Features and/or data generated and tracked by the machine-learning algorithm 110 may be overlaid on the image. In the example, the bounding box 410 is displayed and descriptive text 412 is displayed proximate the bounding box 410. In this example, the descriptive text indicates a confidence level of 50% indicating that the machine-learning algorithm 110 is having difficulty tracking the pedestrian that is moving in the path of a car. In the example, the crowd worker 128 has highlighted or selected the draw line command 516. The crowd worker 128 has also drawn a line 512 that separates the obstructing car from the tracked pedestrian (e.g., bounding box 410). In addition, the crowd worker 128 has placed a text label 514 ("car") on the vehicle. The information entered by the crowd worker 128 may be transferred to the crowd worker interface 116 for further processing.

The crowd worker interface 116 may be configured to address other cases as well. In other examples, the tracked feature may be lost due to changes in light conditions. For example, a pedestrian walking from sunlight to shadows may become less recognizable to the machine-learning algorithm 110. In such a case, the crowd worker 128 may provide an input that indicates that the pedestrian has walked into a shadowy area. Such conditions could occur in the evening near street lights. These conditions could also be present near tunnels or underpasses in which light conditions may change as the vehicle or pedestrian moves about.

Figure 6:
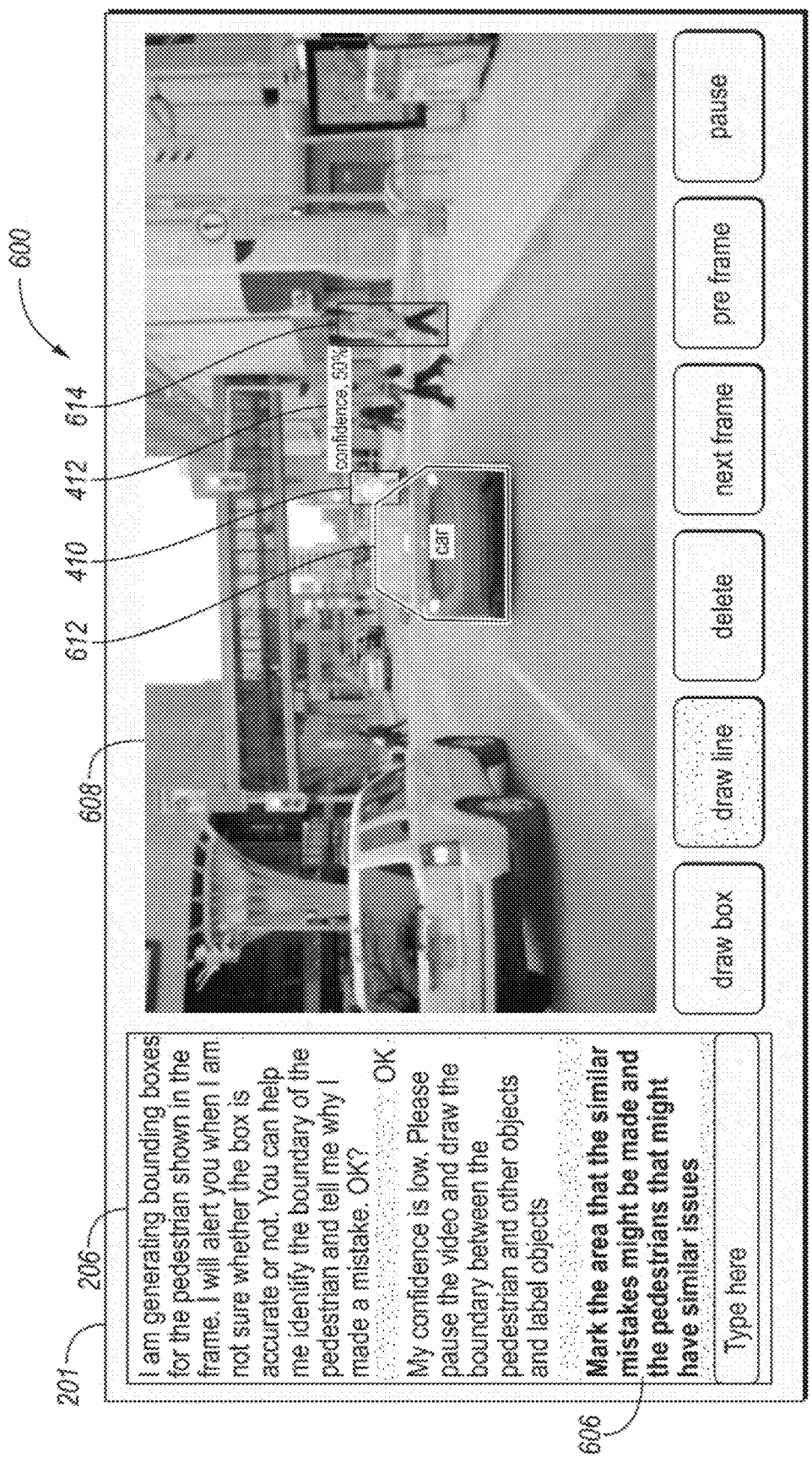
FIG. 6 depicts an example of a display output for the data annotation system that includes additional examples of annotations inserted by the task executor.

FIG. 6 depicts an example of a fifth screen snapshot 600 of the display screen 201 that may represent another portion of the task execution. A fifth image 608 may be displayed on the display screen 201. The fifth screen snapshot 500 may be similar to the fourth screen snapshot 400 with additional crowd worker inputs. In addition, the crowd worker interface 116 has caused another instruction dialog 606 to be displayed in the chat window 206. In this example, the instruction dialog 606 requests the crowd worker 128 to mark additional areas on the image for which similar issues may occur. This provides the system with additional data that can be used to adjust the machine-learning algorithm 110 predictions for which similar mistakes may occur. In this example, the crowd worker 128 has drawn a boundary 612 around the car and highlighted another pedestrian with a second box 614. In this case, the machine-learning algorithm 110 is likely to have the same problem with the newly identified pedestrian being occluded by the car. The entered data may be transferred to the crowd worker interface 116 for further processing.

Figure 7:
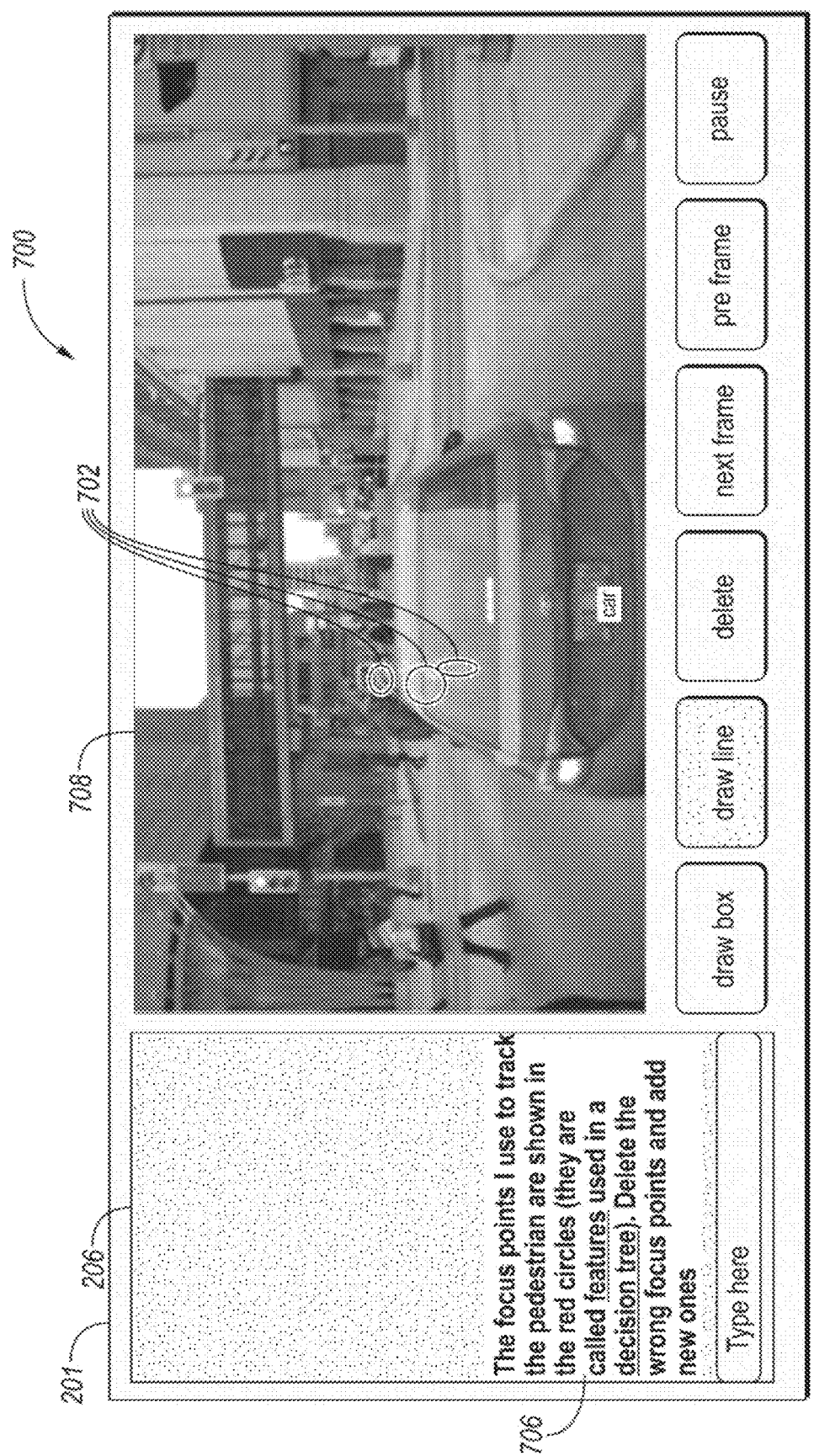
FIG. 7 depicts an example of a display output for the data annotation system that includes additional machine-learning algorithm features.

FIG. 7 depicts an example of a sixth screen snapshot 700 of the display screen 201 that may represent another portion of the task execution. A sixth image 708 may be displayed on the display screen 201. In this example, the crowd worker interface 116 displays elements 702 that represent focus points for the machine-learning algorithm 110. In addition, the crowd worker interface 116 causes another instruction dialog 706 in the chat window 206. In this example, the instruction dialog instructs the crowd worker 128 to delete or add a focus point by drawing on the image. This may provide the crowd worker 128 with an additional level of detail as to the functioning of the machine-learning algorithm 110. In addition, this permits the crowd worker 128 to assess the accuracy of the focus points that are being used by the machine-learning algorithm 110. The interface may be extended to include other internal selection criteria that are used by machine-learning algorithm 110.

Figure 8:
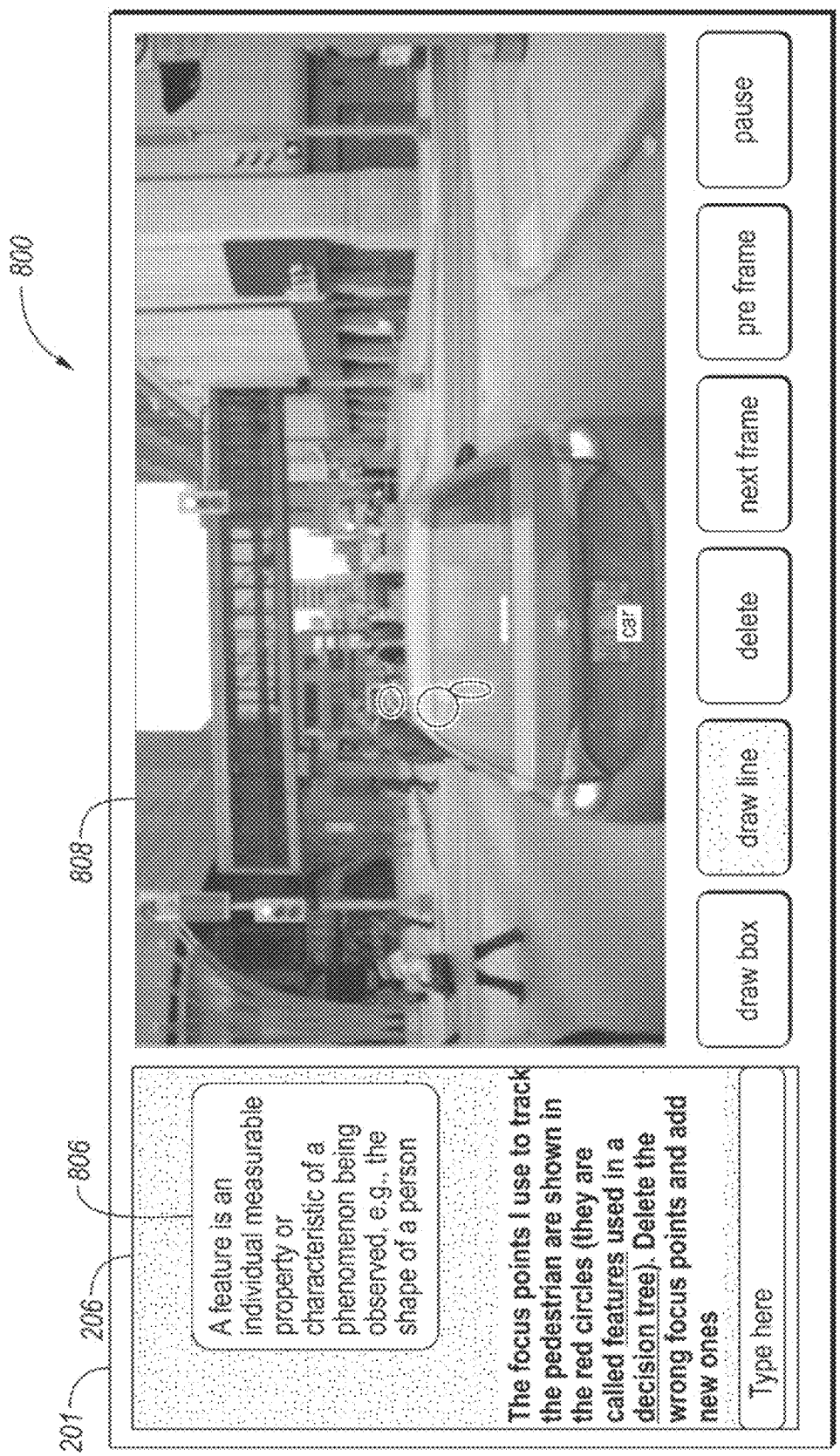
FIG. 8 depicts an example of a display output for the data annotation system that includes explanatory dialog elements.

FIG. 8 depicts an example of a seventh screen snapshot 800 of the display screen 201 that may represent another portion of the task execution. A seventh image 808 may be displayed on the display screen 201. In this example, the crowd worker interface 116 has caused an explanatory dialog 806 to be displayed in the chat window 206. The explanatory dialog 806 may include information that explains certain terms or provides additional information. The explanatory dialog 806 may be displayed responsive to a crowd worker request. For example, the display of explanatory dialogs 806 may be in response to the crowd worker 128 typing in a request such as "What is a feature?". In other examples, the explanatory dialog 806 may be presented by holding a cursor over a text term in the chat window 206 for a predetermined time. In other examples, the system could include a voice interface and may respond to a verbal request from the crowd worker 128. The explanatory dialogs 806 may explain how the machine-learning algorithm 110 makes predictions and provide insight into the operation of the algorithms.

The crowd worker interface 116 may be configured to explain terms and language used by the machine-learning algorithm 110. The crowd worker interface 116 may cause display of output text dialogs that explains the tasks to be performed by the crowd worker 128. The text dialogs may help the crowd worker 128 in understanding the machine-learning algorithm 110. In addition, the text dialog may provide information that is useful for helping the crowd worker 128 generate accurate input for the machine-learning algorithm 110.

FIGS. 2-8 represent portions of a possible crowd-source task being executed. The interactive task may be configured to assist the machine-learning algorithm 110 in the data annotation process. The interactive task may also be configured to maintain the interest of the crowd workers 128 by providing additional information about the machine-learning algorithm 110.

Figure 9:
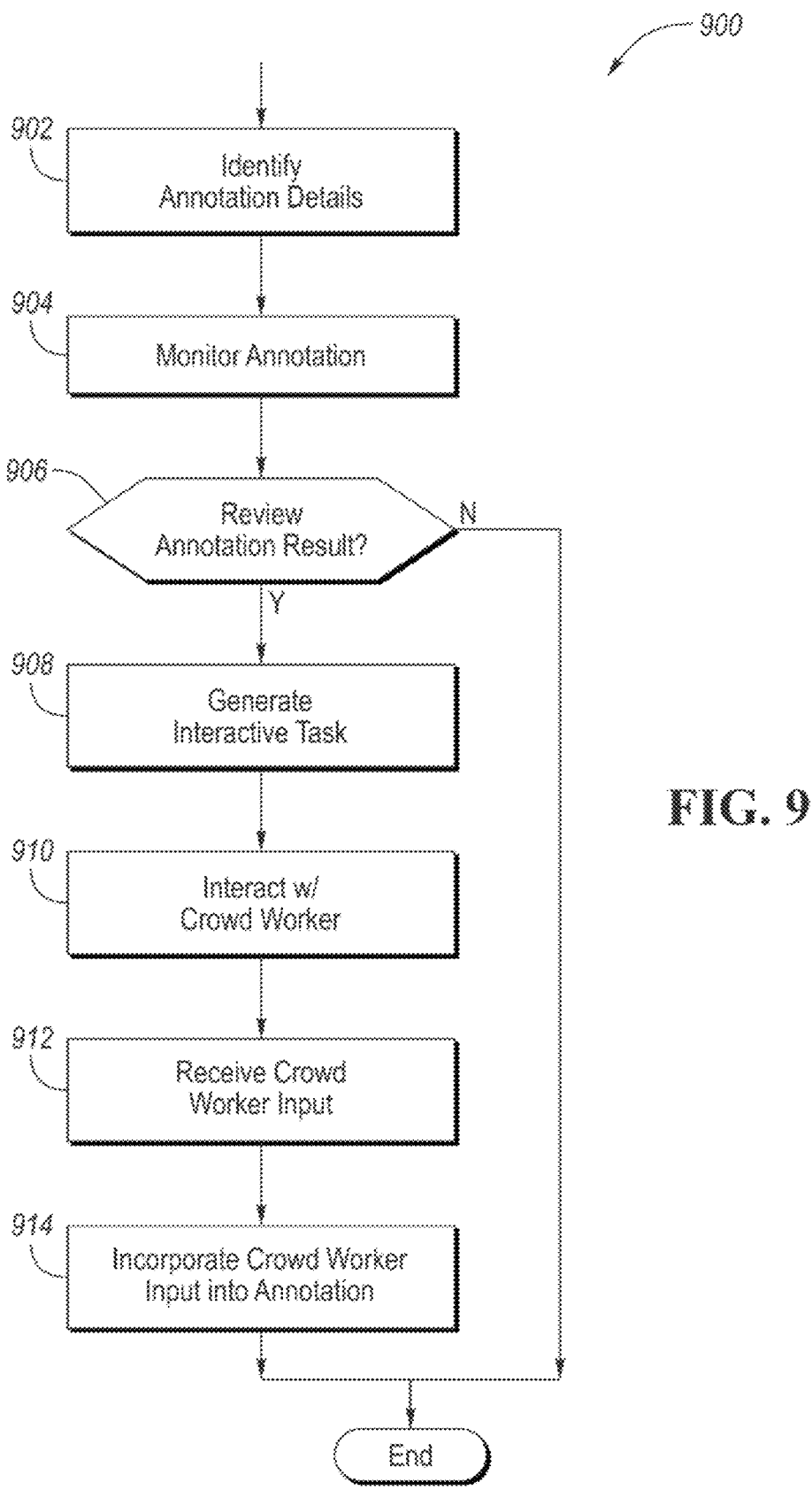
FIG. 9 is possible flowchart for a data annotation system.

FIG. 9 depicts a flowchart 900 for a possible sequence of operations that may be implemented by the computing system 102. At operation 902, the data annotation system may identify annotation details. The machine-learning algorithm 110 may be executed to identify predetermined features in a set of input data. At operation 904, the annotation results may be monitored. For example, the corresponding confidence levels may be checked. In other cases, random sampling may be implemented. Additional criteria may be monitored to detect inaccuracies in the annotation provided by the machine-learning algorithm 110. For example, an annotation that includes a large number of identified features or zero identified features may be selected for further review.

At operation 906, a check is performed to determine if the annotation results are to be reviewed by a crowd worker 128. For example, a review may be initiated responsive to the confidence level being below a low-confidence threshold. A review may be initiated responsive to identifying the predetermined feature with a confidence level exceeding a threshold followed by a reduction in the confidence level to less than a low-confidence threshold. In other cases, the review may be randomly initiated for quality control purposes. If a review is initiated, operation 908 may be performed. Execution may stop until the next annotation cycle if a review is not initiated.

At operation 908, an interactive task may be initiated. For example, a task may be registered with the crowd-sourcing service. The interactive task may be as described previously herein. At operation 910, the data annotation system may interact with the crowd worker 128 as described as part of the interactive task execution. At operation 912, the data annotation system may receive the crowd worker input. The crowd worker input may include information to identify inaccurate feature identification or other inaccuracies in the output generated by the machine-learning algorithm 110. At operation, 914, the crowd worker input may be incorporated in to the annotation process. The operations may be repeated for each annotation cycle. The entire sequence may be iterative and may be performed each time the machine-learning algorithm 110 is used to generate annotation data.

The crowd worker interface 116 may be configured for different machine-learning algorithms 110. Each machine-learning algorithm 110 may have different annotation requirements. For example, machine-learning algorithms for vehicle applications may be configured to identify different objects in the roadway. Machine-learning algorithms may be trained to identify various objects on or near the roadway such as other vehicles, pedestrians, signs, bridges. Each machine-learning algorithm may focus on different features in an image. As such, instructions for each type of algorithm may be slightly different. The system designer may modify the interface for each of the algorithms in order to facilitate effective crowd worker support.

In the example presented, the crowd worker interface 116 identified the frame at which the machine-learning algorithm 110 was having difficulty. In other cases, such as for randomly selected monitoring, a different interface may be presented. The crowd worker 128 may be tasked with identifying false positives. In the pedestrian example, this may be a case in which the machine-learning algorithm 110 has high confidence that an object is a pedestrian, but in fact, is not. The crowd worker 128 may be able to pause the video and identify the mistaken classification. For example, the crowd worker 128 may highlight the object and type a label to annotate the object. In other cases, the crowd worker 128 may be tasked with identifying false negatives. In the pedestrian example, this may be a case in which the machine-learning algorithm 110 has not identified an object as a pedestrian that is clearly a pedestrian.

The crowd worker interface 116 may include a translation or conversion function for effectively communicating terms and elements between the machine-learning algorithm 110 and the crowd worker 128. The machine-learning algorithm 110 may represent certain features in a particular manner. For example, the bounding boxes may be represented as a set of image coordinates. The crowd worker interface 116 may convert the set of image coordinates to a box on the image frame at the appropriate location. Likewise, the crowd worker 128 may draw a box on the display screen. The crowd worker interface 116 may convert the box as displayed on the screen to coordinates that are understood by the machine-learning algorithm 110. In addition, text annotations may be converted to a form usable by the machine-learning algorithm 110. Text annotations may be associated with a boundary drawn by the crowd worker 128.

The crowd worker interface 116 may be designed to elicit feedback from the crowd workers 128 to explain the reasons for low confidence values for a given algorithm decision. As such, there may be known situations for which confidence levels may be low. The designer may program the crowd worker interface 116 to cover the known situations. The crowd worker interface 116 may be configured to present predetermined questions to the crowd worker 128. For example, a question dialog may be displayed in the chat window 206. If a pedestrian being occluded by a car may happen often, the question dialog could ask a question such as "Is a car occluding the view of the highlighted pedestrian?". The crowd worker 128 may enter "Yes" or "No" in response to the question dialog.

The crowd worker interface 116 may depict features used by the machine-learning algorithm 110 to make a decision. For example, the crowd worker interface 116 may display focus points as highlighted areas that led to the decision. The crowd worker 128 may be prompted to verify that the focus points are valid and useful for the particular decision. The crowd worker interface 116 may display various elements that are used in the decision-making process. This provides the crowd worker 128 a window into the machine-learning algorithm 110. It further allows the crowd worker 128 to refine the elements or features that are used by the machine-learning algorithm 110. In the examples, updating the focus points could lead to a change in the way the machine-learning algorithm 110 arrives at a decision. In the examples, deleting some focus points while the pedestrian is partially occluded by the vehicle may lead to improved tracking during the occlusion. For example, the focus point may be redefined to enhance the tracking of the head of the pedestrian as it appears to move across the vehicle.

The inputs received from the crowd-source tasks may be used to update the training dataset 112 for the machine-learning algorithm 110. The machine-learning algorithm 110 may use the updated training dataset 112 to relearn the weighting factors. It is expected that by improving the training dataset 112 that the machine-learning algorithm 110 will become more accurate over time.

The described systems and methods improve data annotation by improving the performance of the machine-learning algorithm. An accurate machine-learning algorithm may be able to generate annotation data much faster and at lower cost than humans can. The data annotation system attempts to explain the machine-learning process to laymen to provide a better understanding of such systems. This may contribute to awareness and understanding of machine-learning systems. The system as described has uses in cases in which the machine-learning system recognizes that accuracy is lacking and cases in which the machine-learning system appears to be operating properly.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A data annotation system comprising:
a computing system programmed to
execute a machine-learning algorithm that is programmed to identify a feature within a digital image as being a predetermined feature and a corresponding confidence level from an input dataset, and,
responsive to identifying the feature within the digital image with the corresponding confidence level exceeding a threshold followed by a reduction in the corresponding confidence level to less than a low-confidence threshold, execute a crowd worker interface that is programmed to generate an interactive task configured to display the input dataset and the feature identified within the digital image by the machine-learning algorithm and receive feedback from a crowd worker to identify a reason for the reduction in the corresponding confidence level being less than the low-confidence threshold.

2. The data annotation system of claim 1, wherein the crowd worker interface is further programmed to cause a text dialog to be displayed on a display screen, wherein the text dialog includes instructions to guide the crowd worker in completing the interactive task.

3. The data annotation system of claim 1, wherein the crowd worker interface is further programmed to receive the feedback from the crowd worker as data corresponding to elements drawn on a display screen.

4. The data annotation system of claim 1, wherein the crowd worker interface is further programmed to receive the feedback from the crowd worker as a text annotation of an on-screen object entered on a display screen.

5. The data annotation system of claim 1, wherein the crowd worker interface is further programmed to cause, responsive to the input dataset corresponding to the reduction being displayed on a display screen, a dialog element to be displayed on the display screen that alerts the crowd worker to the reduction.

6. The data annotation system of claim 1, wherein the crowd worker interface is further programmed to cause a dialog element to be displayed on a display screen that instructs the crowd worker to identify features for which a similar reduction in confidence level is expected to occur.

7. The data annotation system of claim 1, wherein the crowd worker interface is further programmed to convert between machine-learning algorithm representations to visual representations suitable for human understanding.

8. The data annotation system of claim 1, wherein the input dataset is a video segment comprised of a plurality of image frames.

9. The data annotation system of claim 8, wherein the computing system is further programmed to execute the crowd worker interface responsive to the input dataset being randomly selected for monitoring.

10. A method comprising:
identifying, by a machine-learning algorithm, a feature within a digital image as being a predetermined feature and a corresponding confidence level from an input dataset; and
generating, responsive to identifying the feature within the digital image with a confidence level exceeding a threshold followed by a reduction in the confidence level to less than a low-confidence threshold, an interactive task for crowd sourcing to display the input dataset and the feature within the digital image identified by the machine-learning algorithm on a display screen and receive feedback from a crowd worker to identify a reason for the reduction in the corresponding confidence level being less than the low-confidence threshold.

11. The method of claim 10 further comprising causing a text dialog that includes instructions to guide the crowd worker in completing the interactive task to be displayed on the display screen.

12. The method of claim 10 further comprising causing, responsive to the input dataset corresponding to the reduction being displayed on the display screen, a dialog element to be displayed on the display screen that alerts the crowd worker to the reduction.

13. The method of claim 10 further comprising causing a dialog element to be displayed on the display screen that instructs the crowd worker to identify features for which a similar reduction in confidence level is expected to occur.

14. The method of claim 10 further comprising updating a dataset for the machine-learning algorithm with the feedback received from the crowd worker.

15. The method of claim 10 further comprising generating, responsive to input dataset being randomly selected for monitoring, the interactive task for crowd sourcing to display the input dataset and features identified by the machine-learning algorithm on a display screen and receive feedback from a crowd worker to identify inaccurate feature identification.

16. The method of claim 10 further comprising causing a dialog to be displayed that includes operational details of the machine-learning algorithm to aid the crowd worker in understanding the machine-learning algorithm.

17. A data annotation system comprising:

a computing system programmed to execute a machine-learning algorithm that is programmed to identify a feature within a digital image as a predetermined feature from an input dataset, and, responsive to a presence of conditions indicative of the feature being inaccurately identified, execute a crowd worker interface that is programmed to (i) generate an interactive task for completion by a crowd worker, and (ii), upon the interactive task being initiated by the crowd worker, display the feature within the digital image identified by the machine-learning algorithm as the predetermined feature overlaid on the input dataset and receive feedback from the crowd worker to identify a reason for the feature being inaccurately identified.

18. The data annotation system of claim 17, wherein the crowd worker interface is further programmed to visually communicate predictions of the machine-learning algorithm and to identify areas of concern in natural language.

19. The data annotation system of claim 17, wherein the machine-learning algorithm is further programmed to generate a confidence level corresponding to features identified as the predetermined feature, and the conditions indicative of the predetermined feature being inaccurately identified includes the confidence level being less than a low-confidence threshold.

20. The data annotation system of claim 17, wherein the machine-learning algorithm is further programmed to generate a confidence level corresponding to features identified as the predetermined feature, and the conditions indicative of the predetermined feature being inaccurately identified includes the confidence level being greater than a predetermined threshold followed by a reduction in the confidence level to being less than a low-confidence threshold.

* * * * *